June 28, 1932.   H. J. SCHNEIDERWIRTH   1,864,767
PURIFICATION APPARATUS
Filed March 19, 1928   2 Sheets-Sheet 1
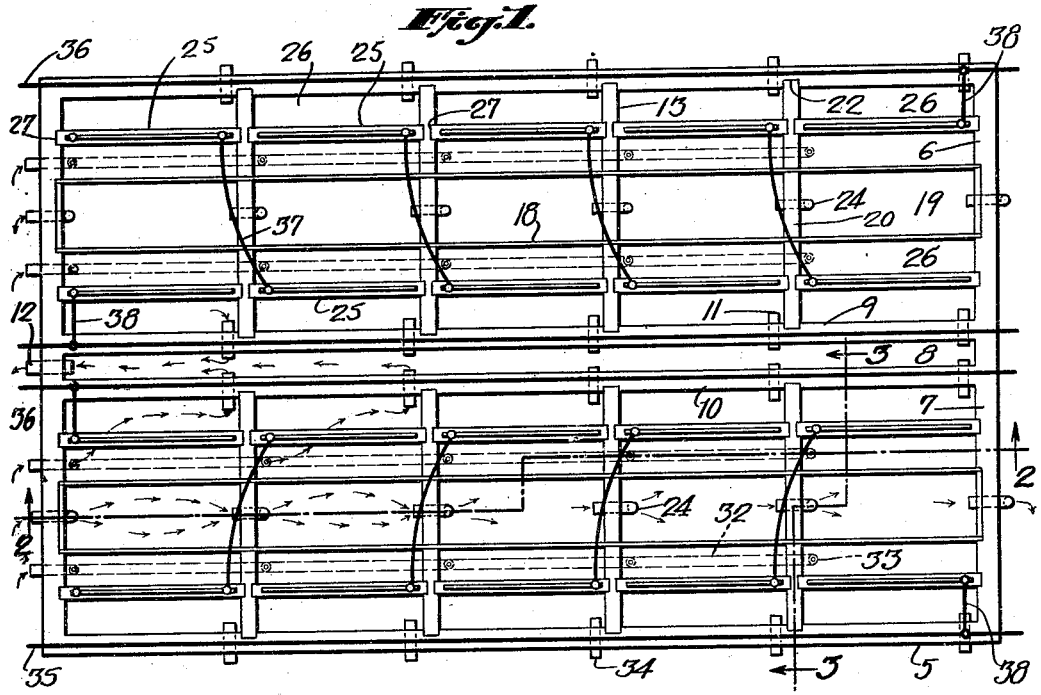
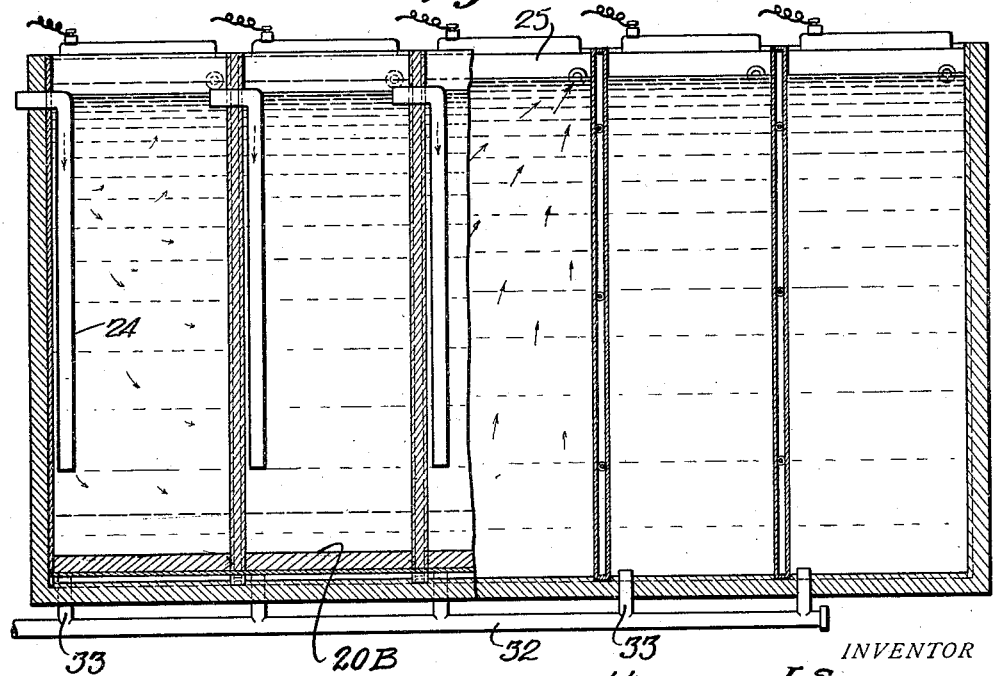
INVENTOR
HERMAN J. SCHNEIDERWIRTH.
BY Irving L. McCathran
ATTORNEY

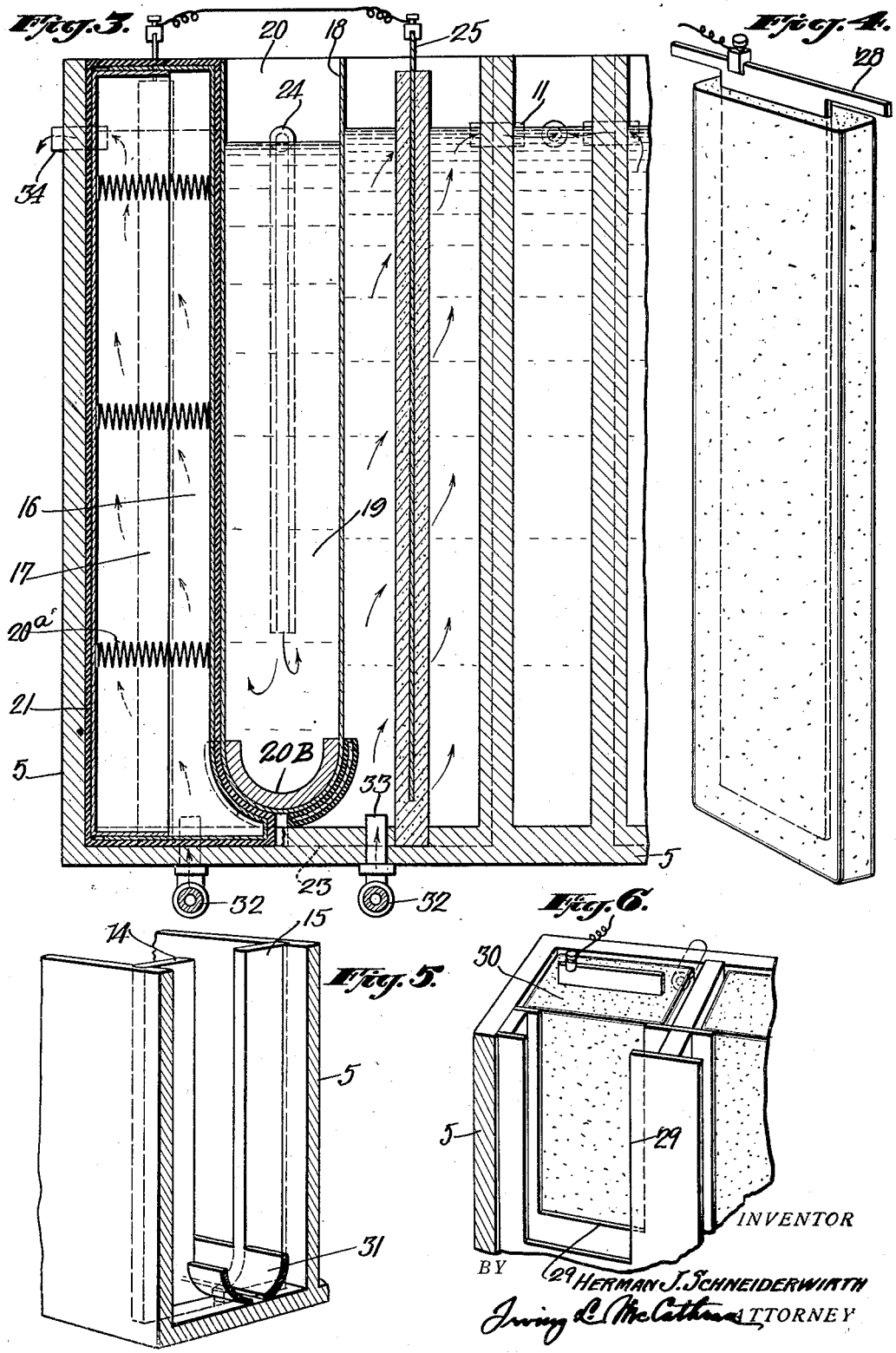

Patented June 28, 1932

1,864,767

UNITED STATES PATENT OFFICE

HERMAN J. SCHNEIDERWIRTH, OF NEW YORK, N. Y.

PURIFICATION APPARATUS

Application filed March 19, 1928. Serial No. 262,967.

This invention relates to the purification of liquids and in particular to an apparatus for the electro-dialytic and electro-osmotic purification of water and other liquids.

A particular object of the invention is to provide an apparatus in which all or a number of the diaphragms heretofore used in the electro-dialytic purification process of liquids may be eliminated or modified by applying instead of full diaphragms, diaphragms having large cut-outs in combination with electrodes covered with porous masses absorbing and eliminating certain impurities like calcium, magnesium, iron, aluminum and other compounds which have been especially held responsible for clogging up the full diaphragm thereby increasing the resistance for the electric current and finally stopping the further penetration of other salts and impurities through the diaphragm.

A still further object of the invention is to provide a purification apparatus which can be constructed in continual lines of separated three cell systems, the whole of which can be put up, dismantled and cleaned with a minimum of time and effort.

A still further object of the invention is the elimination of breakable parts and small accessories necessary to the construction of such a purification apparatus, for instance, which employs glass siphons to carry the liquid to be purified from one middle cell to the other, which requires time in assembling and which are elements to be considered in the addition to the purification of the liquid, thereby making more difficult the technical application.

A still further object of the invention is to provide a construction of the character referred to in which the replacement of the partition in the communicating pipes can be readily replaced without disturbing the construction of the device itself.

To enable others skilled in the art to fully comprehend the underlying features of my invention that they may embody the same in the various modifications in structure and relation contemplated, drawings depicting a preferred form has been annexed as a part of this disclosure and in such drawings, similar reference characters denote corresponding parts throughout all the views, of which, Figure 1 is a top plan view of an apparatus constructed in accordance with my invention, showing the electro-dialytic and electro-osmotic purification of water and other liquids, the construction in this instance being illustrative of combinations of three cell units.

Figure 2 is a section taken on the line 2—2 of Figure 1 and shows the construction of my improved apparatus.

Figure 3 is an enlarged section in elevation taken on the line 3—3 of Figure 1 showing the construction of the lateral cell walls which are used to hold in place, a unitary diaphragm which divides each partition space into a three cell unit.

Figure 4 is a view in perspective of one form of electrode arranged for use in connection with my improved apparatus.

Figure 5 is a view in perspective of a fragmentary portion of one side of the apparatus showing the partition member arranged to receive the diaphragm through the medium of which a compartment is divided into three cells, and Figure 6 is a view in perspective of a modified form of electrode wrapped in a porous mass which is arranged to fill a cell, the diaphragm for use in connection therewith being clearly illustrated and being also of modified cut-out construction.

The purification and separation of liquids with the aid of an electric current between two separating walls has been heretofore introduced in the chemical industry. The electro-dialytic and electro-osmotic procedure is based on principles which employ an apparatus divided into three cells containing in each, an outside cell and an electrode, one of which is used as an anode and is made of magnetite, carbon and other suitable material while the other is used as a cathode and is made of iron, brass or other suitable material. The middle cell contains the liquid to be purified while the outside cells are usually rinsed with water. The walls separating the middle cell from the outside cells are called diaphragms. The latter are watertight and impermeable for certain materials but under the influence of an electric current, they are permeable for salts respectively, for their electrically charged disassociated parts, called ions and for certain other electrically charged materials. The diaphragms are usually made of sail-cloth, cotton, parchment, leather, clay and other materials, according to the necessity. They are also of different densities, either impregnated or not. For the anode side, that is, the cell containing the anode, usually positive charged diaphragms like animal skin, leather and other materials are used, while the side cell containing the cathode is usually separated by means of a negatively charged diaphragm made from vegetable matters like sail-cloth, cotton, parchment and other materials.

The simplest electro-osmotic procedure is the purification of water and in this respect, three cells of the above described apparatus established with suitable diaphragms and electrodes are filled with water and an electric current from 110 to 220 volts is sent through this arrangement. Almost immediately the ions or salts in the middle cell start to penetrate the diaphragm in moving to the corresponding electrodes in the side cells. There they are discharged and are removed by rinsing water. The movement continues until the middle cell is free from salts and equal to distilled water. In case organic matters, suspensions and colloidals are present in the water, a movement of these bodies will also follow when they are electrically charged. For instance, a fine suspension of clay will move to the anode. If the diaphragms are not permeable to these bodies, they will either settle on the corresponding diaphragm or will precipitate during the process in the middle cell, where they can be removed.

In this way, it is possible to obtain under certain conditions, an absolutely pure water containing any amount of salts desired, or a pure water absolutely free from salts and equal to distilled water.

The practical application of this process makes it necessary to construct an apparatus for working continually and suitable for conditions in a large plant and with this in view, I have constructed a form which may be made up in any number of units, which may be of any length or width desired and may contain any number of cells. This construction contemplates the use of a box or casing 5 made of wood or other insulating material and having slotted end and slotted side walls 6 and 7 respectively. The casing is further provided with the spaced slotted walls 9 and 10 which extend between the end walls 7 and form therebetween, a rinse chamber 8 of relatively narrow proportion than the chambers formed between the walls 9 and 10 and the walls 6 of the casing. The walls 9 and 10 are provided with short pipes 11 at spaced points, these points being determined in advance for the partitioning of the compartments into suitable cells, the method of this separation being hereinafter described.

The pipes 11 therefore, will connect the center chamber 8 with each of the side cells to be formed and one of the end walls of the chamber 8 is provided with an outlet pipe 12 through the medium of which the water in the chamber 8 will be drained, it being noted that this water will be mixed with the water running from the adjacent side cells and from the sets of plus or minus electrodes.

The slotted walls 9 and 10 receive one side of partition forming holders 13 which are arranged to be slid down into suitable slots formed in said walls and also in the side walls 6 of the casing 5. These holders 13 are divided into two portions 14 and 15, as illustrated in Figure 5, each of the portions being substantially alike and being arranged to support between them, the longitudinally extending diaphragm 18. This diaphragm is made of any suitable material which is permeable for the ion that it is contemplated will be drawn from the water to be processed or from the liquid that is contained in the central cell.

Inspection of Figure 3 will show that the diaphragm 18 is substantially U-shape in cross section extends between the two end walls of the casing and forms a central cell 19. Suitable wall pieces 20 in the nature of partitions having semi-circular lower edges and semi-circular spacers 20—B are employed to maintain the diaphragm 19 in its U-shaped formation and said walls and spacers are secured in the diaphragm 18 in any suitable manner the wall pieces 20 being in alignment with the opposing edges of the holders 13 and arranged to be acted upon by the portions 14 and 15 thereof in a manner to be hereinafter described. Each of the portions 14 and 15 of the holders 13 are identical and it is not believed necessary to describe both of them, it being sufficient to say that the portion 14 is provided with the relatively movable parts 16 and 17 which are maintained in spaced relation through the medium of the coil springs 20—A which are suitably connected to said parts 16 and 17. When the diaphragm is fastened by strings or rubber bands around its filler parts 20 and 20—B which are slightly wider than the unoccupied space between parts 14 and 15, are pushed in and positioned between the parts 14 and 15 of the holders, they will be effectively held through the medium of the pressure exerted by the said coil springs 20—A. The members 14 and 15 are completely covered with sheet rubber or other insulating elastic waterproof material 21 and are arranged to be set down into slots formed in the walls 9 and 10 and the side walls 6 of the casing 5, where they may be fastened temporarily, the slots being indicated by the numeral 22. These slots continuing across the bottom of the casing as at 23 so that the compartments formed by the supports 13 are separated from each other and are of an individual nature. Each compartment is formed into a three-cell unit through the medium of the diaphragm 18 and the filler block or walls 20. Each of these wall pieces 20 is provided with a pipe 24 whereby the water or liquid can pass from cell to cell, and from end to end of the casing 5 to be acted upon by the minus and plus electrodes 25 which are positioned in the side cells 26. The both sides of the apparatus, that is, the parts lying on either side of the central chamber 8 are identical in construction and consequently the explanation of one side thereof is all that is necessary to set forth the construction.

The electrodes may be sufficiently wide to just set between the holders 13 or they may be arranged to slide into suitable slots 27 provided in the opposite sides of the holder and in the walls of the casing 5. These electrodes may be positioned as described or may be provided with extensions 28 at the upper edges thereof for the purpose of suspending the electrodes in position in the electrode cells.

When it is desired to eliminate the use of the diaphragm as illustrated in Figure 6, openings may be cut therein as indicated by the numeral 29 and the electrode covering may be of sufficient size as at 30 to completely fill the cell which it occupies. The electrode, of course, would be covered with a mass of porous material, such as cotton, flax, sponge, refuse, hair or felt preparations and others. Also porous masses of inorganic origin like porous stones such as pumice and others which have been found suitable. These coverings absorb and hold back especially calcium, magnesium, iron, aluminum and similar compounds and organic impurities, thus eliminating calcination and clogging up of the diaphragm, which after a certain time stops the passage of the salts and acts as a resistance to the electric current.

The portions 14 and 15 of the supports or holders 13 are provided with extensions 31 of arcuate shape. These extensions 31 provide a seat for the diaphragm and also join all of the parts 15 together longitudinally and join all of the parts 14 together longitudinally, making a solid unitary structure of each of the parts 14 and 15 in themselves, so that all of the parts 14 might be placed at one side of the chamber and then all of the parts 15 can be placed in the other side of the chamber after which the diaphragm with its wall pieces 20 and spacers 20—B can be positioned between them and securely held in place, thus making up a set of watertight three celled units in any number desired, depending upon the length of the casing used. Also, more than two lines of three cell units may be arranged in one casing by widening same and adding more compartments and drain chambers. Each of the lines of three cell units may be worked upon separately by the electric current providing for each line a separate inlet and outlet of the liquid to be purified or the liquid flowing out from the last middle cell of one cell-line may be carried by a short connecting pipe or rubber hose from outside the casing to the neighboring middle cell of the next cell-line. The liquid would then flow further also, through this cell-line though in the opposite direction, which does not make any difference. In this way, it is possible to provide only one inlet and one outlet for a liquid to be purified and also to let same flow through an unlimited number of cells while being acted upon by electric current. This has a great advantage as my experience shows that same liquids cannot be completely freed of all impurities in sending same even in a slow flow through only one line of three cell units, even if there are 10 (ten) units in one line. To provide a greater number than 10 units in one line has been found to be impractical.

In order that water may be supplied for rinsing the side cells or electrode cells, as they might be termed, I have provided suitable pipes 32 having branches 33 which enter each of the electrode cells, suitable pipe outlets 34 being provided in the side walls of the casing 5 for the exit of the water led in by some of the pipes 33, while the pipes 11 in the walls 9 and 10 permit flow of the water from the adjacent electrode cells into the center compartment 8 and hence out through the drain 12, at the end thereof.

It is to be understood that all of the pipes are made of rubber or other insulating material and afford connection between the cells so that distribution of the liquid may take place.

The upper surfaces of the outer side walls of the casing 5 and the upper surfaces or edges of the walls 9 and 10 are sufficiently wide to accommodate bus bars 35 and 36, the latter in this instance may be designated plus and the former, minus, the electrodes being electrically connected thereto and to each other in any desired manner so that the electro-dialytic action may occur between the sets of electrodes disposed in the electrode cells, that is, the electro-dialytic action would take place through the diaphragm 19 and as illustrated by the numeral 37, an electrical connector is used to connect the electrodes. It will be understood that the electrodes can be connected in any desired manner, depending upon the desired current tension in each cell.

As shown at 38 in Figure 1, five cell units are connected in a manner whereby a whole tension of 110 volts is used, each of the 5 cell units being under a tension of 22 volts. Any other connection can be made by connecting 2, 3, 4, 5 and more cell units together or in letting the whole tension act upon each cell unit separately. Connections with the electric current carrying metal strips are easily made as the latter, having a plus or minus charge, extend along the upper edges of the outside and inside walls of the casing. The apparatus can also be used for ordinary dialytic and combined dialytic and electro-dialytic purposes.

It is evident, therefore, that I have provided a liquid purification apparatus of simplified construction, involving few parts, which may be readily assembled or dismantled and a construction which lends itself to modification in any number of units to take care of manufacturing conditions.

It is also evident that I have provided a purification apparatus in which the liquid may continually flow therethrough and which may be acted upon at its different stages of flow through the apparatus continuously thus providing a means whereby the process may be carried on continuously purifying the liquid more and more from cell to cell with a saving in time and without the attention of a number of operators.

It is also evident that in a construction of this character electrodes surrounded with a porous mass may be employed in conjunction with modified cut-out diaphragms which is also new with regard to the process and improves the latter greatly.

And it is also evident that this latter arrangement may be used in any combination with full diaphragm and that the electric current may be supplied from metal strips or bus bars positioned on the upper edges of the casing which is of insulating material.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. An apparatus for the treatment of fluids comprising a casing having slotted section forming walls therein, holders removably disposed in said slots and extending between said walls and dividing said sections into compartments, said holders comprising expandible members, springs between said members, and a flexible waterproof covering housing said springs and said expandible members, diaphragms releasably held between the expandible members and arranged to divide the compartments into cells, wall pieces between said expandible members arranged to support pipes leading the liquid to be purified from one of the middle cells to the next and about which said diaphragms are secured.

2. An apparatus for the treatment of fluids comprising a casing having slotted section forming walls therein, holders removably disposed in said slots and extending between said wall and dividing said sections into compartments, said holders comprising expandible members, diaphragms releasably held between the expandible members and arranged to divide the compartments into cells and wall pieces between said expandible members arranged to support pipes leading the liquid to be purified from one of the middle cels to the next adjacent middle cell.

3. An apparatus for the treatment of fluids comprising a casing having slotted section forming walls therein, holders removably disposed in said slots and extending between said wall and dividing said sections into compartments, said holders comprising expandible members, and diaphragms releasably held between the expandible members and arranged to divide the compartments into cells.

4. An apparatus for the treatment of fluids comprising a casing having slotted section forming walls therein, holders removably disposed in said slots and extending between said walls and dividing said sections into compartments, wall pieces in the holders arranged to support pipes and said pipes constituting passages between adjacent compartments and diaphragms releasably held in the holders.

5. An apparatus for the treatment of fluids comprising a casing having slotted section forming walls therein, holders removably disposed in said slots and extending between said walls and dividing said sections into compartments, said holders comprising expandible members, wall pieces in the holders arranged to support pipes constituting passages between adjacent cells and diaphragms releasably held between the expandible members, and arranged to divide the compartments into cells.

6. An apparatus for the treatment of fluids comprising a casing having slotted section forming walls therein, holders removably disposed in said slots and extending between said walls dividing said section into compartments, said holders comprising expandible members, wall pieces in the holders arranged to support pipes and said diaphragms being secured in said holders and about said wall pieces to divide said compartments into cell units and said pipes constituting passages between adjacent cells.

7. An apparatus for the treatment of fluids comprising a casing having slotted section forming walls therein, holders removably disposed in said slots and extending between said walls and dividing said sections into compartments, said holders comprising expandible members, diaphragms releasably held between the expandible members and arranged to divide the compartments into cells, wall pieces between said expandible members arranged to support pipes leading the liquid to be purified from one cell to an adjacent cell.

8. An apparatus for the treatment of fluids comprising a casing having slotted section forming walls therein, expandible members constituting self adjusting holders removably disposed in said slots and extending between said walls and dividing said sections into compartments, diaphragms releasably held between the expandible members and arranged to divide the compartments into cells, and wall pieces between said expandible members arranged to support pipes constituting passageways between adjacent cells.

In testimony whereof I affix my signature.

HERMAN J. SCHNEIDERWIRTH. [L. S.]